(12) United States Patent
Kondo

(10) Patent No.: US 7,165,217 B1
(45) Date of Patent: Jan. 16, 2007

(54) ELECTRONIC BOOK DISPLAY DEVICE AND ITS DISPLAY METHOD

(75) Inventor: Kazumoto Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 799 days.

(21) Appl. No.: 09/596,110

(22) Filed: Jun. 16, 2000

(30) Foreign Application Priority Data

Jun. 18, 1999 (JP) .................................. 11-172754

(51) Int. Cl.
*G06F 17/00* (2006.01)

(52) U.S. Cl. ..................... 715/529; 715/528; 345/153

(58) Field of Classification Search ................ 715/526, 715/512, 529, 528; 345/821, 822, 179, 156, 345/153
See application file for complete search history.

(56) References Cited

U.S. PATENT DOCUMENTS

| | | | | |
|---|---|---|---|---|
| 5,239,665 A | * | 8/1993 | Tsuchiya | ..................... 345/776 |
| 5,475,398 A | * | 12/1995 | Yamazaki et al. | .......... 345/104 |
| 5,663,748 A | * | 9/1997 | Huffman et al. | ............. 345/173 |
| 5,885,012 A | * | 3/1999 | Hastings et al. | ............... 400/83 |
| 6,331,865 B1 | * | 12/2001 | Sachs et al. | ................. 345/776 |
| 6,384,815 B1 | * | 5/2002 | Huang | ......................... 345/179 |

* cited by examiner

*Primary Examiner*—Heather R. Herndon
*Assistant Examiner*—Michael K. Botts
(74) *Attorney, Agent, or Firm*—Finnegan, Henderson, Farabow, Garrett & Dunner, L.L.P.

(57) ABSTRACT

An electronic book display device capable of attaching the mark to the optional element by just conducting the simple operation like actual books. Since the display control means 28 is provided for determining the type of mark to emphasize the specifying element according to the position specified in the region on which the specified element is displayed and for attaching the determined mark to the specified element, the user can determine the type of mark easily just by specifying the desired position in the region on which the specified element is displayed. And thus, the user can attach the mark to the optional element just by conducting the simple operation like actual books.

12 Claims, 8 Drawing Sheets

ELECTRONIC BOOK DISPLAY DEVICE AND ITS DISPLAY METHOD

BACKGROUND OF THE INVENTION

1. Field of the Invention

The present invention relates to an electronic book display device and its display method, and more particularly, is suitably applied to the electronic book to display book data such as characters and graphics on the display screen.

2. Description of the Related Art

Heretofore, an electronic book which stores book data such as characters and graphics contained in the book in the recording medium in advance and displays these on the display screen upon reading out these book data from the recording medium as occasion demands has been proposed. And if the user exchanges the recording medium to set into this electronic book, he can read a variety of books.

However, in practice, there are cases where the user draws lines under a sequence of characters to which the user pays attention and draws markers such as by applying color on a sequence of characters using the fluorescent pen. In these cases, sequences of characters to which the user pays attention will be emphasized by underline or marker, and thus the user can recognize the important part in the page at first glance.

Moreover, in the electronic book described above, the function to draw underlines and markers onto the desired sequence of characters among sentences to be displayed on the display screen is installed. And thus, the user can emphasize a sequence of characters to which he pays attention by drawing underlines and markers onto the sequence of characters.

However, in the electronic book according to the construction as described above, the user has to conduct two stages of operations when drawing underlines and markers onto a sequence of characters to be focused attention; such as the user has to select Icon for drawing underlines or markers from the menu on which multiple Icons are displayed and then, specify the range of character sequence focused attention in the sentence. And thus, it has created a problem that the operation becomes complicated as compared with the case of just drawing underlines and markers onto the sequences of characters focused attention in the page the user is reading.

SUMMARY OF THE INVENTION

In view of the foregoing, an object of the invention is to provide an electronic book display device and its display method capable of attaching marks to the optional element just by conducting the simply operation as in the case of actual book.

The foregoing object and other objects of the invention have been achieved by the provision of an electronic book display device which comprises the display means for displaying multiple elements comprising contents of book, and the display control means for determining the type of mark to emphasize the specifying elements according to the position specified in the area on which the specified element is displayed and for attaching the determined mark to the specified element.

Thus, by determining the type of mark to emphasize the specifying element according to the position specified in the area on which the specified element is displayed and attaching the determined mark to the specified element, the user can determine the type of mark by specifying the desired position in the area on which the specified element is displayed.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Construction of Electronic Book

Figure 1:
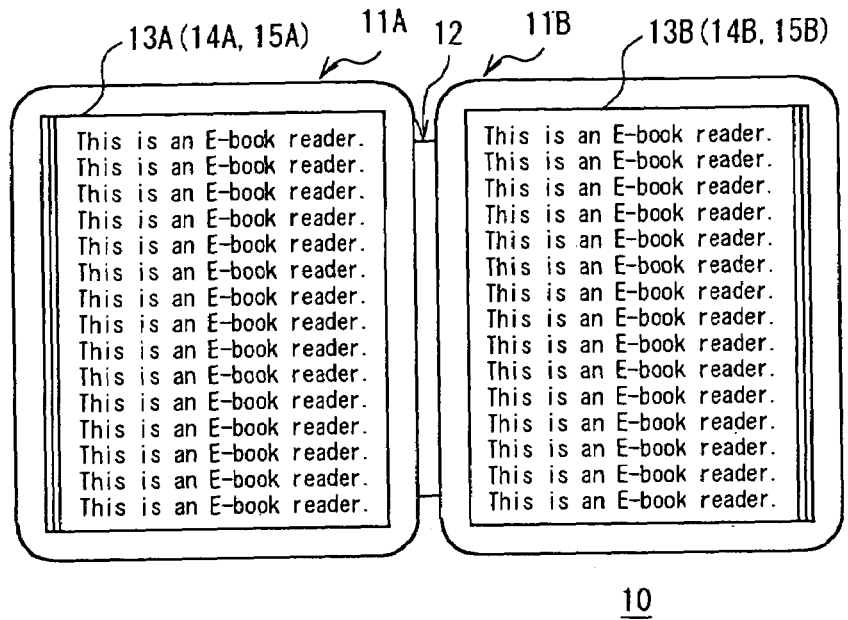
FIG. 1 is a brief linear diagram showing one embodiment of an electronic book according to the present invention.
Figure 2:
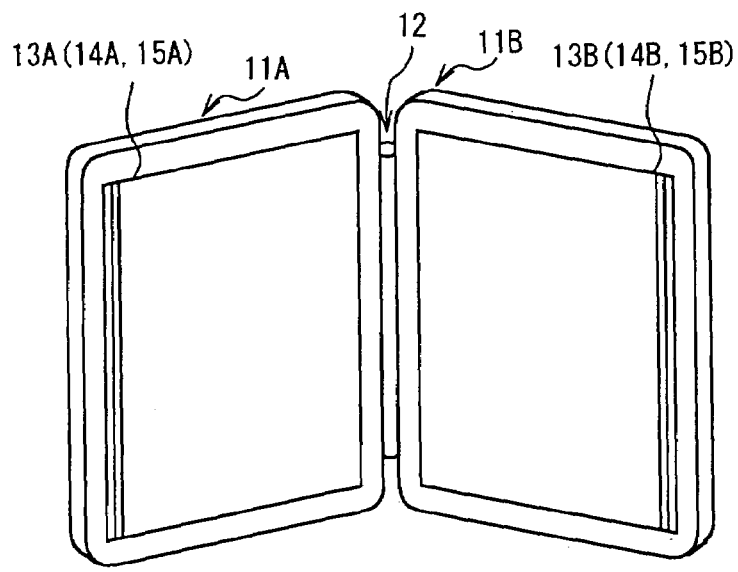
FIG. 2 is a brief linear diagram showing the construction of an electronic book.
Figure 10:
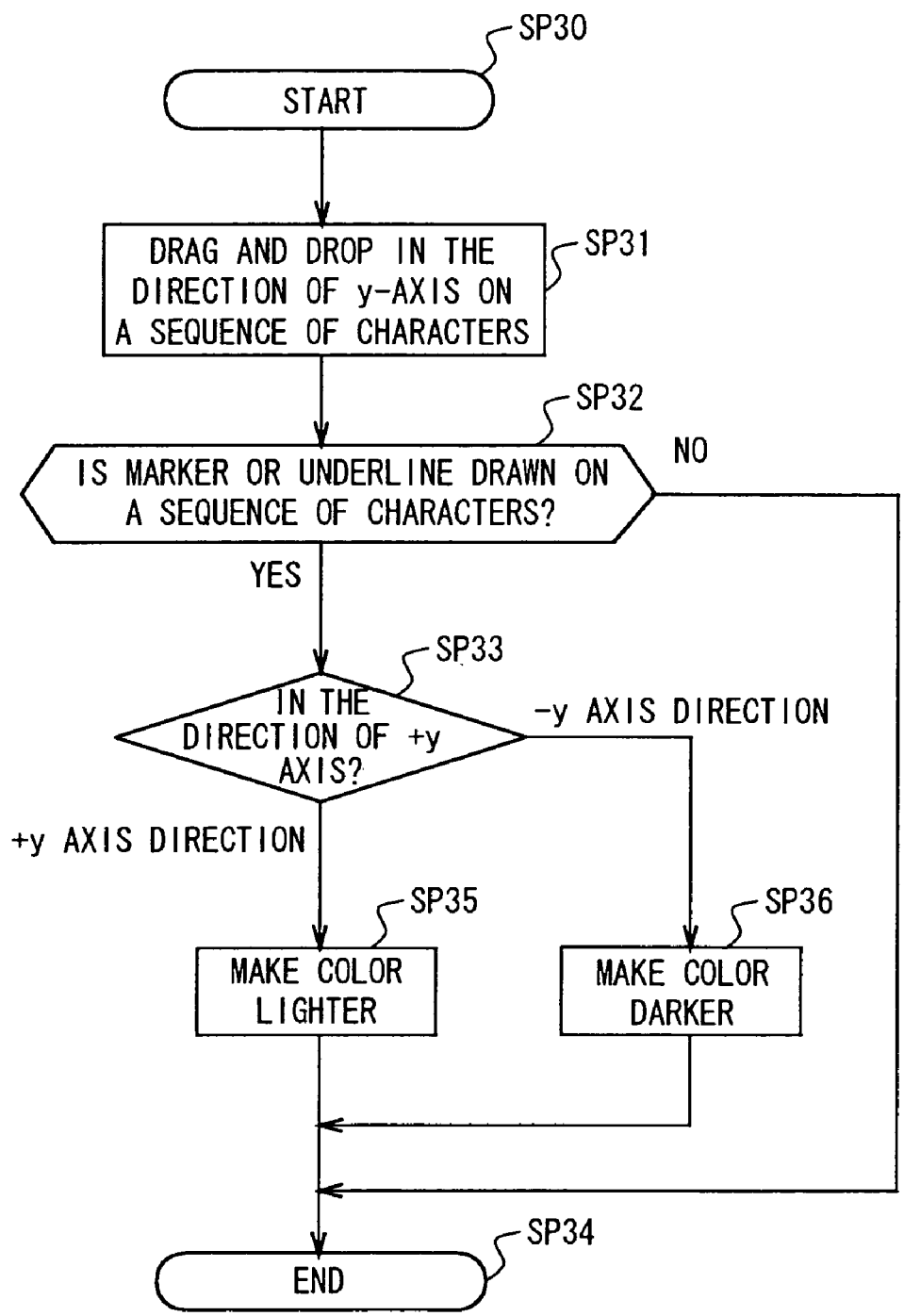
FIG. 10 is a flow chart showing the display color changing method.

In FIGS. 1 and 2, 10 generally shows the external construction of an electronic book. And body boxes 11A and 11B, in which the predetermined electronic circuits are stored respectively, are connected rotation free by a rotating axis 12 so that these can conduct open/close operation like actual books. In this case, body boxes 11A and 11B are equipped with operation display units 13A and 13B on which touch panels having the same coordinates as the liquid crystal panel are attached on the liquid crystal panels respectively. And the touch panel comprises operation input units 14A and 14B to receive operational information that the user inputs using his finger or a pen. And the liquid crystal panel comprises display units 15A, 15B for displaying book data such as characters and graphics.

(2) Circuit Construction of Electronic Book

Figure 3:
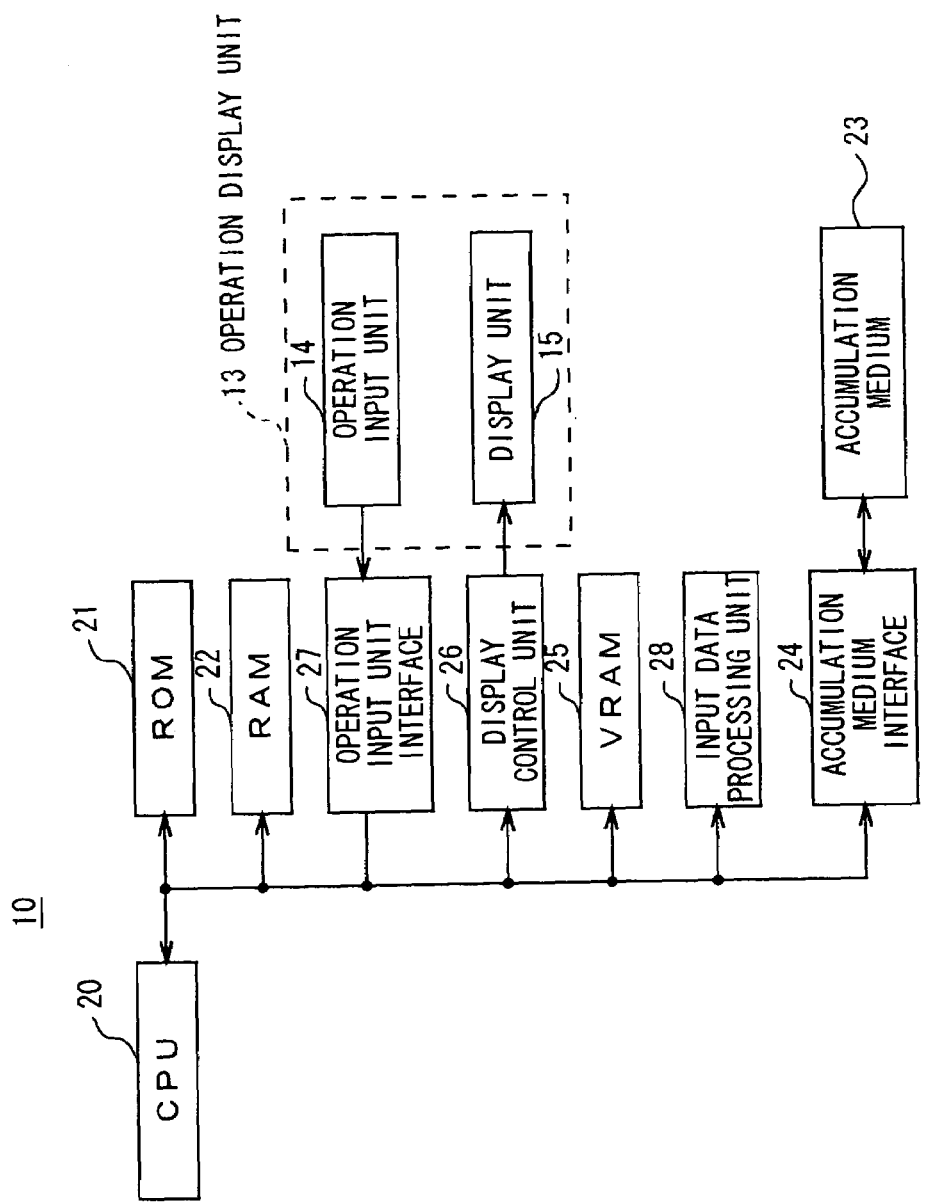
FIG. 3 is a block diagram showing the circuit construction of an electronic book.

At this point, the circuit construction of an electronic book 10 will be shown in FIG. 3. Central processing unit (CPU) 20 reads out the program stored in a read only memory (ROM) 21 as occasion demands, and expands and memorizes the program read out in a random access memory (RAM) 22. And the CPU 20, by reading out and executing the program expanded in this RAM 22, controls each circuit of the electronic book 10.

An accumulation medium 23 is formed of semi-conductor memory such as memory card, and comprises a readout only book data recording area for storing the book data on the book contents for one book and an input data memory area for storing the input data to be supplied from an operation input unit 14 via an operation input interface 27.

Then, the CPU 20 reads out the book data stored in the book data recording area of the accumulation medium 23 via the accumulation medium interface 24, and after forming image data based on the book data read out, transmits this to video RAM (VRAM) 25 and conducts the image drawing processing. And the CPU 20 reads out the image data written in this VRAM 25 and transmitting the read-out image data to the display unit 15 via the display control unit 26, displays this on the display unit 15.

Furthermore, when the operational information is supplied from the operation input unit 14 via the operation input interface 27, the CPU 20 reads out the book data from the accumulation medium 23 via the accumulation medium interface 24 based on the operational information as occasion demands. And after forming the image data based on the book data read out, the CPU 20 stores this in the VRAM 25. And then, the CPU 20 reads out the image data from this VRAM 25, and by transmitting the image data to the display unit 15 via the display control unit 26 and displaying this on the display unit 15, the CPU 20 changes contents of the display of the display unit 15.

The input data processing unit 28 comprising the display control means functions based on the control of CPU 20, and applies the predetermined data processing to the input data supplied from the operation input unit 14 via the operation input interface 27. And displaying the processing result on the display unit 15 via the display control unit 26, the input data processing unit 28 memorizes this in the input data memory area of the accumulation medium 23 via the accumulation medium interface 24.

This electronic book 10 has the function to draw underlines onto a sequence of characters to which the user pays attention, and the function to draw markers onto the sequence of characters as if using a fluorescent color pen.

More specifically, the user draws underlines or markers onto the sequence of characters to which the user himself pays attention in the sentence displayed on the operation display unit 13 by using the predetermined special pen forming the input means. At this point, the input data processing unit 28 reads the range specified in the operation display unit 13, and after applying the graphic drawing processing such as drawing underline and marker on the range specified to the VRAM 25, displays the underline or marker on the operation display unit 13. And simultaneously, the input data processing unit 28 memorizes the data regarding the underline or marker drawn on the sequence of characters in the input data memory area of the data accumulation medium 23.

With this arrangement, when the input data processing unit 28 returns to the previous page on which write-in is conducted, after it has moved to the other page from the page on which the underline or marker is drawn, or when it starts after the electric source of the device has been cut off, the input data processing unit 28 can display the book data under the condition in which it conducted write-in last time.

(3) Font Type of Characters

Figure 4:
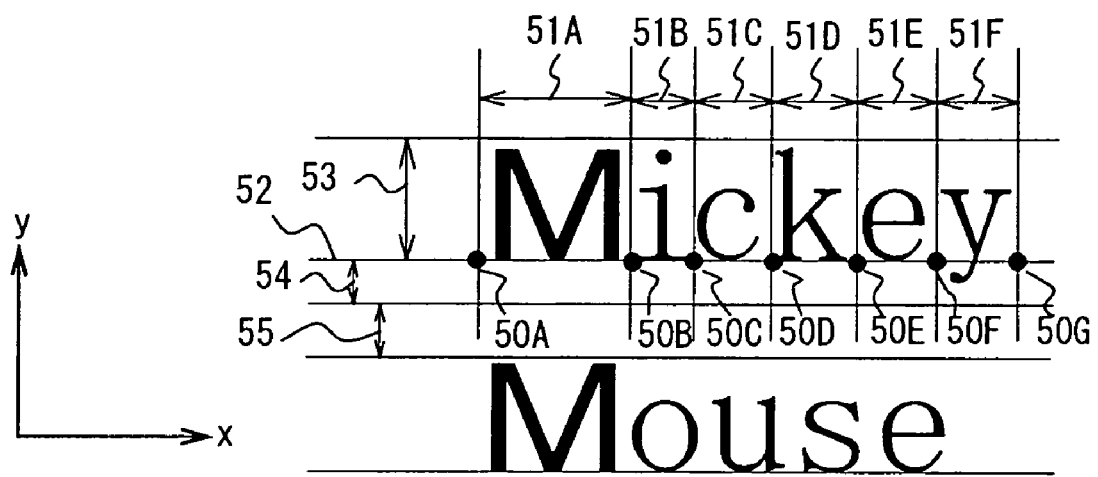
FIG. 4 is a brief linear diagram showing the type font of characters.

At this point, the font type of characters to be displayed on the operation display unit 13 will be explained referring to FIG. 4. In this case, the operation display unit 13 defines reference points 50A to 50G as the standard position when drawing characters. Since the widths of characters 51A to 51F are different from character to character, the width of character specific is defined to each character and the character to be drawn next to the character already drawn will be drawn making the position moved to the right (in the direction of x axis) for the width of character drawn already as the reference points 50A to 50G.

The line to connect the reference points 50A to 50G in the direction of x axis is defined as a base line 52. In these characters drawn, the upper side range (+y axis direction side) relative to this base line 52 is defined as ascent 53, and the lower side range (−y axis direction side) is defined as descent 54, and the space from the line the characters are drawn to the next line is defined as leading 55.

(4) Marker and Underline Display Processing

Figure 5:
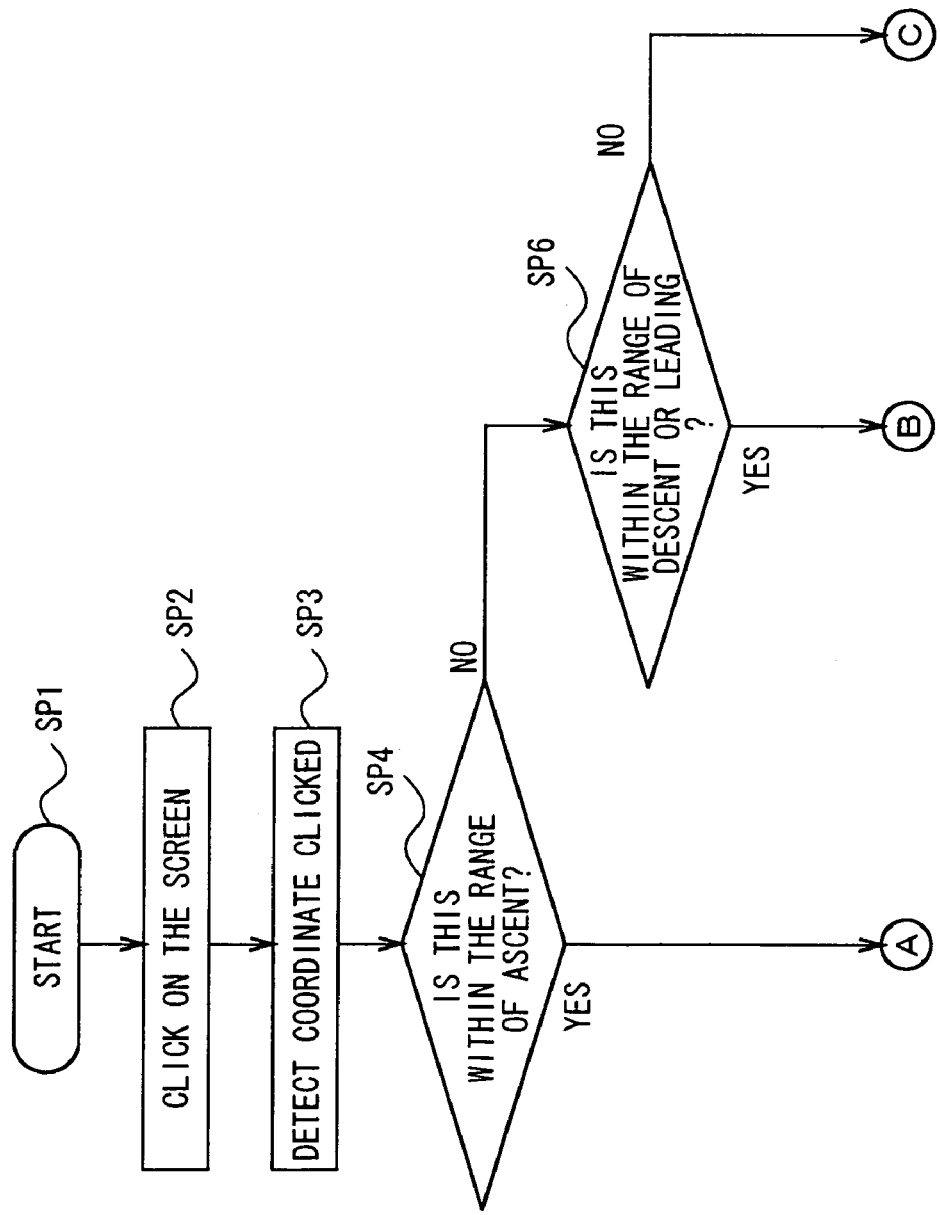
FIG. 5 is a flow chart showing the display method of marker and underline.
Figure 6:
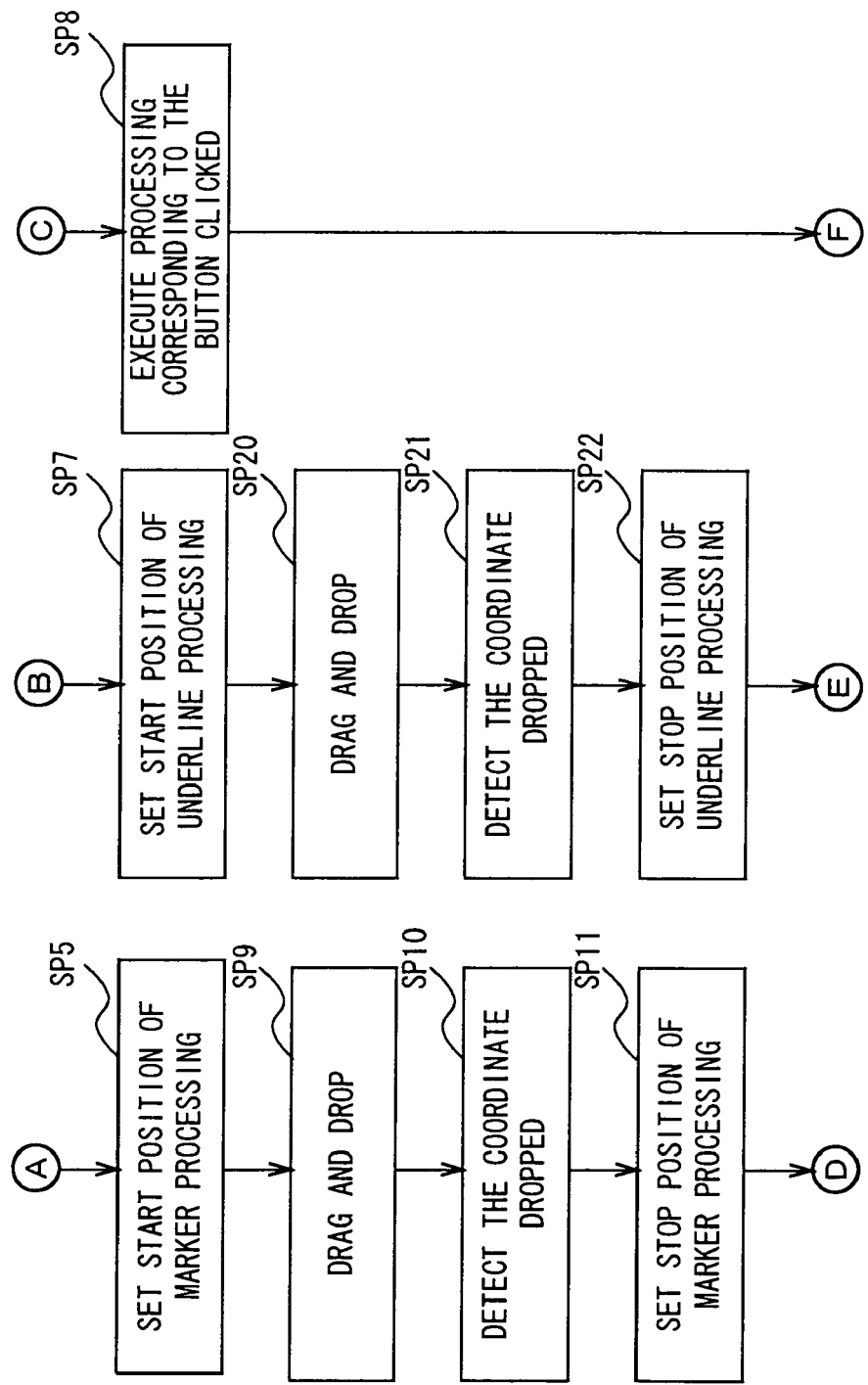
FIG. 6 is a flow chart showing the display method of marker and underline.
Figure 7:
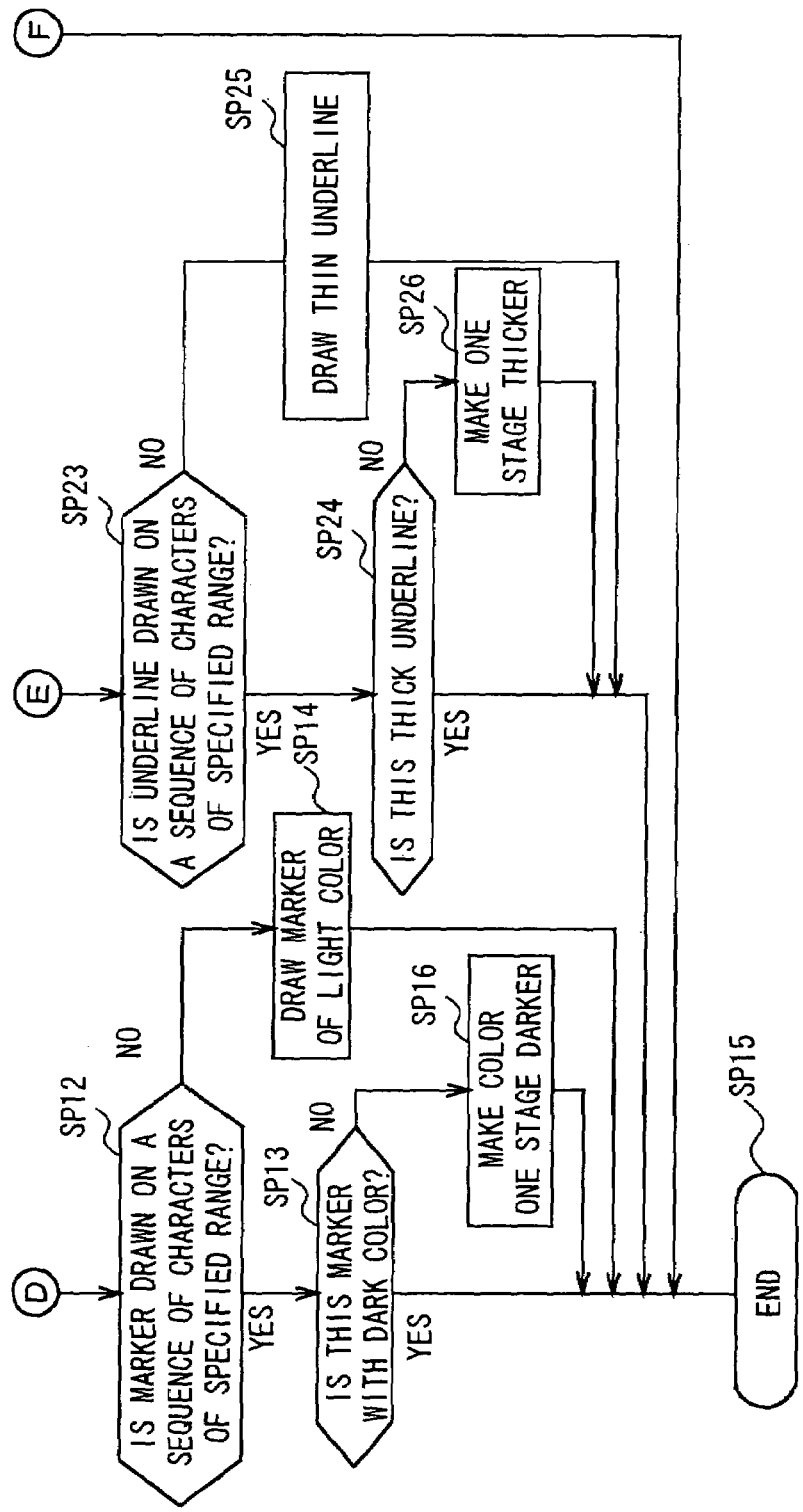
FIG. 7 is a flow chart showing the display method of marker and underline.

At this point, the marker and underline display method will be explained in detail referring to flow charts of FIGS. 5 to 7. Firstly, at the step SP2 entered from the step SP1, when the user clicks on the operation display unit 13 by the specific pen, proceeding to the step SP3, the input data processing unit 28 detects the coordinate clicked.

Then, at the step SP4, the input processing unit 28 judges whether the coordinate detected belongs to the range of ascent of the optional character or not. And as a result, if the coordinate detected is judged that it belongs to the ascent range, the input data processing 28 moves to the step SP5 and if judged that it does not belong to the ascent range, the input data processing 28 moves to the step SP6.

Furthermore, at the step SP6, the input data processing unit 28 judges whether the coordinate detected belongs to the range of descent or leading or not. And as a result, the coordinate detected is judged that it belongs to the range of descent or leading, the input data processing unit 28 moves to the step SP7. On the other hand, if the coordinate detected is judged that it does not belong to the range of descent or leading, the input data processing unit 28 moves to the step SP8.

Thus, in the case where the coordinate detected is judged that it belongs to the range of ascent, the input data processing unit 28 proceeds to the step SP5 and regards the coordinate as the starting point of marker. Then, at the step SP9, when the user drags a pen on the screen from the position on which he clicked the pen to the desired position and lets the pen off (referred to as "drop"), the input data processing unit 28, proceeding to the step SP10, detects the coordinate dropped. And at the step SP11, it regards the coordinate detected as the stop position of marker.

Then, at the step SP12, the input data processing unit 28, accessing to the input data memory area of the accumulation medium 23, judges whether the marker has been already drawn or not on the sequence of characters of the specified range from the starting position to the stop position of the marker. And as a result, if the marker has been drawn already on the sequence of characters of the specified range, the input data processing unit 28 moves to the step SP13, while it is judged that the marker has not been drawn, the input data processing unit 28 moves to the step SP14.

Figure 8:
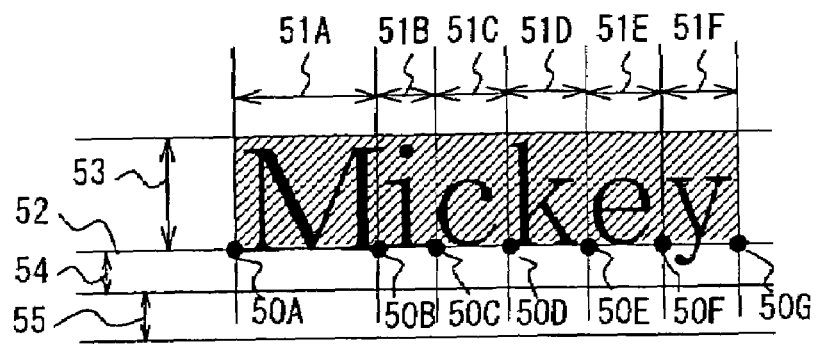
FIG. 8 is a brief linear diagram showing a drawing example of marker.

At the step SP14, as shown in FIG. 8, the input data processing unit 28 draws the marker with the lightest color among three stages of color thickness on the sequence of characters specified, and after writing the fact that it has drawn the lightest marker on the sequence of characters into the input data memory area of the accumulation medium 23, it moves to the step SP15 and terminates the processing.

On the other hand, at the step SP13, the input data processing unit 28 judges whether the marker already drawn is the marker having the thickest color in three stages of color or not. And as a result, if it is judged the marker used is the marker having the thickest color, the input data processing unit 28 moves to the step SP15 and terminates the processing. And if it judges the marker used is not the marker having the thickest color, the input data processing unit 28 moves to the step SP16 and makes the color of marker thicker. And after writing that the color of marker is thickened in the input data memory area of the accumulating medium 23, the input data processing unit 28 moves to the step SP15 and terminates the processing.

In the case where the coordinate detected is judged that it belongs to the range of descent or leading, the input data processing unit 28 proceeds to the step SP7 and regards the coordinate as the starting position of underline. And at the step SP20, when the user conducts the drag and drop operation, the input data processing unit 28 proceeds to the step SP21 and detects the coordinate dropped, and at the step SP22, it regards the detected coordinate as the stop position of the underline.

Then, at the step SP23, by accessing to the input data memory area of the accumulation medium 23, the input data processing unit 28 judges whether underline has been already drawn on the sequence of characters of the specified range from the starting position of underline to the stop position. And as a result, if it is judged that the underline has been drawn onto the sequence of characters of the specified area, the input data processing unit 28 moves to the step SP24. And if it is judged that the underline has not been drawn, the input data processing unit 28 moves to the step SP25.

Figure 9:
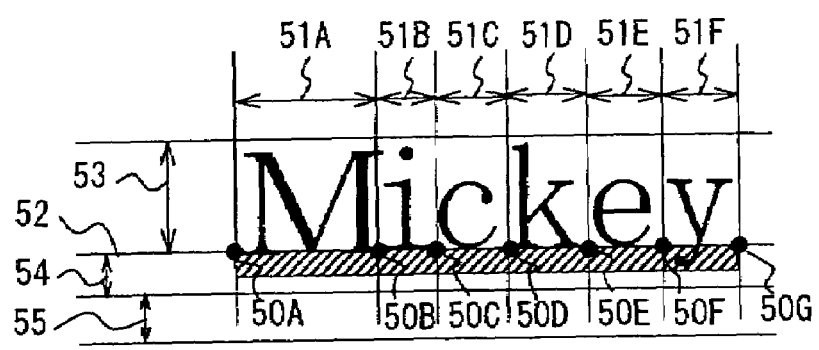
FIG. 9 is a brief linear diagram showing a drawing example of underline.

At the step SP25, as shown in FIG. 9, the input data processing unit 28 draws the thinnest underline from among underlines having three stages of thickness onto the sequence of characters specified. And simultaneously, it writes in that the thinnest underline is drawn onto the sequence of characters in the input data memory area of the accumulation medium 23 and moving to the step SP15, terminates the processing.

On the other hand, at the step SP24, the input data processing unit 28 judges whether or not the underline already drawn is the thickest underline among three stages of underline thickness; and as a result, if it judges that underline drawn is the thickest underline, the input data processing unit 28 moves to the step SP15 and terminates the processing. While it judges that underline is not the thickest one, it moves to the step SP26, and making the thickness of underline one stage thicker, writes this fact in the input data memory area of the accumulation medium 23 and moving to the step SP15, terminates the processing.

In this connection, if the coordinate detected is judged that it does not belong to the range of descent nor the range of leading, the input data processing unit 28 proceeds to the step SP8, and after conducting the processing according to the function allotted to the button placed on the coordinate, moves to the step SP15 and terminates the processing.

Then next, the display color changing method to change colors of underline and marker displayed according to the flow charts of FIGS. 5 to 7 will be explained referring to a flow chart of FIG. 10. At the step SP31 entered from the step SP30, when the user clicks the optional position on the character sequence to which the user pays attention and conducts the drag and drop operation in the direction of y axis from the position clicked, the input data processing unit 28 proceeds to the step SP32 and accesses to the input data memory area of the accumulation medium 23, and judges whether the underline or marker is drawn or not on the character sequence clicked.

As a result, if the input data processing unit 28 judges that the underline or marker is drawn onto the character sequence clicked, it moves to the step SP33. And when it judges neither underline nor marker is drawn, it moves to the step SP34 and terminates the processing.

At the step SP33, the input data processing unit 28 judges that the direction dragged is +y axis direction or −y axis direction. As a result, if the input data processing unit 28 determines that the direction dragged is +y axis direction, moves to the step SP35 and makes color of underline or marker drawn onto the sequence of characters one stage lighter. On the other hand, if the input data processing unit 28 judges that the direction dragged is −y axis direction, moves to the step SP35 and makes color of underline or marker drawn on the sequence of characters one stage darker.

(5) Operation and Effects of the Embodiment

According to the foregoing construction, in the case where the center part of an optional character is clicked by a pen from among multiple characters displayed on the operation display unit 13, the input data processing unit 28 selects marker. On the other hand, when the lower edge part of the character is clicked by the pen, the input data processing unit 28 selects underline. And the input data processing unit 28 displays underline or marker onto the sequence of characters to which the user pays attention from the character clicked first to the character dropped according to the drag and drop operation conducted by the user using the pen.

Accordingly, in the electronic book 10, since the marker will be displayed onto the character sequence if the user traces the center part of the character sequence with the pen, and the underline will be displayed under the character sequence if the user traces the lower edge part of the character sequence, it is no longer necessary to conduct two stages of operation as before; i.e., to specify the range of the target character sequence in addition to selecting either marker or underline. Accordingly, when the user draws underline and marker onto the target character sequence, he has to conduct just simple operation like an actual book.

Furthermore, since the input data processing unit 28 stores frequency that the underline or marker has been drawn in the past in the input data memory area of the accumulation medium 23 per the character sequence, it displays the color of the underline darker or displays the thickness of the marker thicker in the case of drawing underline or marker onto the character sequence on which the underline or marker has been already drawn. With this arrangement, the character sequence on which underline or marker has been drawn many times will be further emphasized as compared with the other character sequence.

Furthermore, when the user conducts the drag and drop operation in the desired direction on the character sequence on which underline or marker is drawn with the pen, the input data processing unit 28 changes color of the underline or marker corresponding to the direction to which the drag and drop operation is conducted. In such electronic book 10, display color of the character sequence can be changed according to the request of the user.

According to the foregoing construction, since the marker will be selected when the center part of the target character is specified, and the underline will be selected when the lower edge part of the character is specified, the underline or marker can be displayed easily if the user just conducts the drag and drop operation to the optional character sequence. Thus, by just conducting the simple operation like the actual book, underline and marker can be drawn.

(6) Other Embodiments

The embodiment described above has dealt with the case of applying the semiconductor memory as the accumulation medium 23. However, the present invention is not limited to this, but various other memory means such as a compact disc-read only memory (CD-ROM) can be applied.

Furthermore, the embodiment described above has dealt with the case of drawing underlines or markers onto the characters to which the user pays special attention. However, the present invention is not limited to this, but underlines and markers can be drawn onto a variety of elements forming contents of the book, such as graphics and symbols.

Furthermore, the embodiment described above has dealt with the case of making the color of marker darker according to the frequency that the marker has been drawn. However, the present invention is not limited to this, but thickness of the marker can be changed according to the frequency that the marker has been drawn. In short, the display condition can be changed according to the frequency that the marker is drawn.

Moreover, the embodiment described above has dealt with the case of making the thickness of underline thicker according to the frequency that the underline is drawn. However, the present invention is not limited to this, but the color of underline can be changed according to the frequency that the underline is drawn. In short, the display condition of underline can be changed according to the frequency that underline is drawn Furthermore, the embodiment described above has dealt with the case of changing color of underline or marker according to drag and drop operating on the character sequence on which underline or marker is drawn in the direction of y-axis. However, the present invention is not limited to this, but the thickness of underline or marker can be changed according to the drag and drop operation on the character sequence on which underline or marker is drawn in the direction of x-axis. In short, the display condition of underline or marker can be changed according to the specifying operation using the pen.

Furthermore, the embodiment described above has dealt with the case of drawing the marker upon selecting marker when the center part of the target character sequence is selected. However, the present invention is not limited to this, but various other marks to emphasize characters, such as encircle line to encircle characters, can be used.

Moreover, the embodiment described above has dealt with the case of selecting underline and drawing the underline when the lower edge part of the target character sequence is selected. However, the present invention is not limited to this, but various other marks to emphasize the characters, such as double lines formed with two underlines arranged at established intervals can be applied.

Furthermore, the embodiment described above has dealt with the case of applying the present invention to an electronic book 10. However, the present invention is not limited to this, but multiple elements forming contents of the book will be displayed on the display and of these multiple elements displayed the target element can be specified with the mouse cursor of the personal computer. And also the present invention can be applied to various other electronic book display devices.

According to the present invention as described above, by determining the type of mark to emphasize the specifying element according to the position specified in the area on which the specified element is displayed and by attaching the determined mark to the specified element, the user can determine the type of mark by just specifying the desired position in the area on which the specified element is displayed. And thus, the user can attach the mark onto the optional element by just conducting simple operation such as actual books.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An electronic book display device, comprising:
    display means for displaying multiple elements forming contents of a book; and
    display control means for determining, based upon a single-step selection technique for specifying one of the multiple elements, one of a plurality of types of marks to emphasize a specified element selected from the multiple elements;
    wherein the type of mark is determined according to a first or second position of the specified element selected by a user and is linked to the specified element,
    wherein the first position of the specified element selected by the user displays a first type of mark onto the specified element, the first position being a center part of the specified element,
    wherein the second position of the specified element selected by the user displays a second type of mark onto the specified element, the second position being a lower edge part of the specified element, and
    wherein the first type of mark is different from the second type of mark.

2. The electronic book display device according to claim 1, wherein the display control means changes the display condition of the first or second type of mark according to the number of times the specified element is specified.

3. The electronic book display device according to claim 1, wherein the display control means changes the display condition of the first or second type of mark displayed on the specified element according to a specified operational procedure.

4. The electronic book display device according to claim 1, wherein the first type of mark is highlighting and the second type of mark is underlining.

5. A display method of an electronic book display device, comprising the steps of:
    displaying multiple elements comprising contents of the electronic book; and
    determining, based upon a single-step selection technique for specifying one of the multiple elements, one of a plurality of types of marks to emphasize a specified element selected from the multiple elements;
    wherein the type of mark is determined according to a first or second position of the specified element selected by a user and is linked to the specified element,
    wherein the first position of the specified element selected by the user displays a first type of mark onto the specified element, the first position being a center part of the specified element,
    wherein the second position of the specified element selected by the user displays a second type of mark onto the specified element, the second position being a lower edge part of the specified element, and
    wherein the first type of mark is different from the second type of mark.

6. The display method of the electronic book display device according to claim 5, further comprising the step of:
changing the display condition of the first or second type of mark according to the number of times the specified element is specified.

7. The display method of the electronic book display device according to claim 5, further comprising the step of:
changing the display condition of the first or second type of mark displayed on the specified element according to a specified operational procedure.

8. The display method of the electronic book display device according to claim 5, wherein the first type of mark is highlighting and the second type of mark is underlining.

9. An information processing apparatus, comprising:
display means for displaying multiple elements; and
display control means for determining, based upon a single-step selection technique for specifying one of the multiple elements, one of a plurality of types of marks to emphasize a specified element selected from the multiple elements;
wherein the type of mark is determined according to a first or second position of the specified element selected and is linked to the specified element,
wherein the first position of the specified element selected displays a first type of mark onto the specified element, the first position being a center part of the specified element,
wherein the second position of the specified element selected displays a second type of mark onto the specified element, the second position being a lower edge part of the specified element, and
wherein the first type of mark is different from the second type of mark.

10. The information processing apparatus according to claim 9, wherein the display control means changes the display condition of the first or second type of mark according to the number of times the specified element is specified.

11. The information processing apparatus according to claim 9, wherein the display control means changes the display condition of the first or second type of mark displayed on the specified element according to a specified operational procedure.

12. The information processing apparatus according to claim 9, wherein the first type of mark is highlighting and the second type of mark is underlining.

* * * * *